Patented Nov. 28, 1944

2,363,910

UNITED STATES PATENT OFFICE 2,363,910

HYDROCARBON DRYING OILS

Miller W. Swaney, Cranford, N. J., assignor to Standard Oil Development Company, a corporation of Delaware No Drawing. Application July 2, 1941,
Serial No. 400,813

11 Claims. (Cl. 260—42)

This invention relates to the production of valuable polymer products from alkyl-alpha-acetylenes, more particularly it relates to a synthesis of useful drying oil polymers together with useful by-products by a low temperature catalytic polymerization of alkyl-alpha-acetylenes.

Rarely is a material found to possess good drying properties, i. e., ability to readily form a hard dry film on exposure to air, and at the same time have good compatibility with plastic hydrocarbon materials as well as oxygen-containing resins. The synthetic resin industry has been forced to rely largely on polar unsaturated esters of fatty acids, commonly known as "drying oils" for obtaining drying effects, although this type of material is notoriously incompatible with many synthetic resins, particularly hydrocarbon resins, and has other shortcomings, such as excessive affinity for water. An object of the present invention is to provide a non-volatile hydrocarbon drying oil which possesses good drying properties and satisfactory compatibility with various resins, including especially hydrocarbon resins. A further object of this invention is to provide a method for securing such hydrocarbon drying oils efficiently and economically with concomitant production of other valuable by-products.

Other objects and advantages of the invention will be apparent from the detailed description which follows.

Up until now the alkyl acetylenes received hardly any attention as raw materials for polymerization, except in some few experiments of academic interest. Acetylene and its more highly unsaturated derivatives, e. g. vinyl acetylene, have been polymerized with heat at elevated temperatures and these reactions have resulted in the formation of complex resinous masses.

The type of low temperature polymerization applied herein to the alkyl acetylenes is not to be confused with the higher temperature polymerization. Vinyl acetylene, for example, readily polymerizes at or above room temperatures, particularly in the presence of oxygen or peroxide catalysts. However, ethyl acetylene differs markedly from vinyl acetylene in that ethyl acetylene is very stable to heat and does not polymerize when heated at 70° C. for a prolonged period in a sealed tube, even when containing dissolved benzoyl peroxide. Under the low temperature conditions of polymerization herein described, ethyl acetylene is energetically polymerized, and, moreover, under these conditions the polymerization leads to the production of more valuable polymeric compounds.

In accordance with the present invention, an alkyl-alpha-acetylene, in which the alkyl group is a methyl, an ethyl, or a higher alkyl group, is subjected in liquid phase to a controlled polymerization in the presence of a polymerization catalyst, preferably of the Friedel-Crafts type, at a temperature sufficiently low to maintain the reactant in liquid phase, and preferably at a temperature below −10° C., to obtain a good yield of polymerization products including a substantial quantity of symmetrically alkylated benzene, which is of industrial value, e. g. as a petroleum oil blending agent, solvent, intermediate, etc., also, including a substantial quantity of higher molecular weight polymers having the character of highly alkylated aromatics with unsaturated aliphatic substituent side chains. Very advantageously the different polymers formed can be readily segregated, so that alkylated benzenes and the polymers of relatively high molecular weight, which exhibit remarkable drying properties can be recovered separately. The high molecular weight polymers are of particular industrial value on account of their good compatibility with hydrocarbon oils, hydrocarbon plastics, cellulose derivatives, and many other kinds of resins.

A highly active Friedel-Crafts type catalyst is particularly adapted for bringing about the desired interlinking of the alkyl acetylene monomer at low temperatures ranging down to −80° C., −100° C., or lower. Catalysts of this type are notably halides of aluminum, boron, zinc, iron, titanium, tin, and the like. This type of catalyst is found to promote the reaction particularly well when used with a diluent or solvent which is substantially indifferent to the catalyst and does not impair the activity of the catalyst, such as a low-boiling alkyl halide. The reaction is conveniently carried out under ordinary atmospheric pressures, but since the reaction is carried out in a liquid phase, sub-atmospheric or super-atmospheric pressures may be used.

An alkyl acetylene of particular interest of the illustrated invention is ethyl acetylene (1-butyne), which has the following formula:

The low temperature polymerization of this type of compound has the very interesting feature, in that it yields a substantial proportion of symmetrically trialkyl benzene, triethyl benzene, along with more highly alkylated benzenes containing unsaturated side chains, and a non-volatile drying oil product. This result is advantageous in that a substantial proportion of the product is the readily segregated trialkyl benzene, or trimer, which contains no olefinic unsaturation.

The desired alkyl acetylene monomer may be obtained by the conversion of naturally occurring hydrocarbons. In some instances, the conversion product may contain several isomeric alkyl-alpha-acetylenes, e. g. methyl-, ethyl-, isopropyl-acetylene and others, which may be separated and recovered by a precipitation as insoluble copper or silver acetylides, from which the free acetylenes are obtained by acidification. Thus, the desired alkyl acetylene may be separated from mixtures of hydrocarbons including paraffins, olefins, and even diolefins having a like number of carbon atoms in the molecule.

Using ethyl acetylene of high purity, which had been synthesized by reaction of diethyl sulfate with sodium acetylide (Na—C≡CH) in liquid ammonia, the procedure of polymerization and the results are specifically illustrated by the following examples:

*Example I*

Twenty-two and one-half (22.5) grams of pure ethylacetylene were mixed with an equal volume of ethyl chloride. To this, at about −80° to −100° C., was added slowly 200 cc. of aluminum chloride solution containing 7.8 grams AlCl₃ in 100 cc. of ethyl chloride. A rapid reaction ensued, and a viscous oily product was formed. After addition of isopropyl alcohol to the reaction mixture, the polymer oil was separated, dissolved in ether, and washed thoroughly with water to remove alcohol. The washed ether solution was dried over calcium chloride (CaCl₂), and subsequently the ether was evaporated with the aid of warming. The oil remaining weighed 18.1 grams and represented a conversion of 80.5% of the ethylacetylene. The remaining unconverted ethylacetylene may be recovered for reuse.

*Example II*

The polymer oil from Example I was vacuum distilled. The first cut was collected at 98–100° C. under 15 mm. Hg absolute pressure and represented 25% of the total. This boiling point is the same as that given in the literature for 1,3,5-triethylbenzene. Further, a Siwoloboff boiling point determination was made on this first cut and it was found that it had a boiling point of 220° C. at 767 mm. Hg corresponding significantly to the 760 mm. Hg boiling point reported in the literature for the 1,3,5-triethylbenzene given as 218° C.

A "bromine test" was run on the first cut, and the components of this cut were found to be completely saturated with respect to olefinic bonds, showing that three molecules of the ethylacetylene became united in the cyclicized compound corresponding in composition to 1,3,5-triethylbenzene. As a further confirmation, however, this cut was brominated with liquid bromine in the dark catalyzed by a trace of iodine. Hydrogen bromide (HBr) was liberated and the brominated material was warmed to boil off excess bromine. The product was crystallized once from absolute alcohol to obtain a high yield of shining crystals which melted sharply at 105° C. corresponding to the melting point given in the literature for 1,3,5 - triethyl - 2,4,6 - tribromobenzene. Therefore, the first cut obtained in 25% yield from the controlled polymerization of the ethylacetylene possesses the structure shown below:

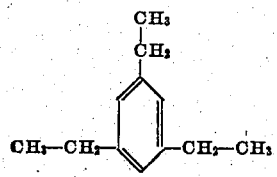

*Example III*

The residue remaining from the distillation of the first cut in the preceding example was further distilled, and a second cut of 25% was collected at about 150° C. under a pressure 12 mm. of mercury, this being characteristic distillation point of hydrocarbons in the C₁₆ range. "Bromine number" tests on this cut showed that its components contain approximately one double bond per 16 carbon atoms. This strongly indicates that the compounds in this cut are more highly alkylated benzene compounds containing an unsaturated side chain and mixtures of such compounds. The compounds in this product apparently possess the structure shown below since bromine determinations showed an absorption of two bromine atoms per 16 carbon atoms. Further, this cut was brominated with liquid bromine and the product obtained, when analyzed, was found to contain 54.6% bromine which represents a composition containing practically 4 bromine atoms per molecule. Therefore, a probable structure is that shown below, the tetrabromide of which had two bromine atoms attached to a side chain while two bromine atoms entered the benzene ring.

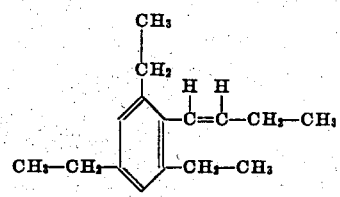

*Example IV*

A residue from the preceding distillations was obtained in a 50% yield as a transparent reddish material very viscous to resinous in character and rather stringy. This residual material was substantially undistillable at 170° C. under an absolute pressure of 1 mm. Hg. Bromine number tests showed the presence of considerably higher unsaturation than in any of the lighter cuts, in that it contained on the average at least about two olefinic double bonds per molecule, with an average of more than 20 carbon atoms per molecule.

At room temperature the residual polymer oil was spread upon glass plates and allowed to stand exposed to the atmosphere. After a number of hours, it was found that a definite film-like surface was present on the glass and that this film could be pulled away from the glass plate in strips showing that this material possessed certain drying properties making it useful for this purpose.

Further tests showed that the non-volatile drying oil product is compatible with various synthetic hydrocarbon polymers, and accordingly may be used to formulate a large number of commercial coating compositions and other valuable products.

Among the synthetic resinous materials for which there is a need of a compatible hardening and drying agent are the plastic linear polymers of olefins, such as isobutylene polymers known as polybutenes and others. These polymers are well known to be non-hardening, substantially inert to oxidation under normal conditions and even difficult to vulcanize by usual methods on account of their highly saturated composition. Although it has been difficult hitherto to find a compatible drying agent for use in these polymers, the ordinary drying oils, such as, unsaturated fatty acid glycerides, being unsuitable, the high molecular weight unsaturated polymers of an alkyl-alpha-acetylene answer this need very well. Other types of resins including various other high molecular weight hydrocarbon resins, alkyd resins, cellulose derivatives, etc., with which these drying oils may be used in making paints, inks, lacquers, coatings, sheets, films, etc.

This is best illustrated by the following examples:

Example V

Three parts of poly-isobutene of approximately 30,000 molecular weight, and one part of polymer oil from Example IV were dissolved in 50 parts of petroleum ether. This solution was allowed to evaporate in a shallow dish whereupon a clear film of good flexibility was obtained. Its toughness considerably increased on exposure to air.

Example VI

Three parts of high-viscosity ethyl cellulose and one part of polymer oil from Example IV were dissolved in 30 parts of acetone. This clear viscous solution was allowed to evaporate in a shallow dish thereby leaving a clear transparent film which soon became dry and tough though quite flexible. The film thus prepared was considerably more flexible and durable than a similar film prepared from the ethylcellulose alone.

The reaction conditions and procedure of the polymerization are subject to variation depending somewhat upon the reactants chosen, the particular catalyst, the diluent, the purity of the reactants, and the products desired. Liquefied normally gaseous organic compounds, such as, ethane, ethylene, or propane, which are substantially unreactive but which volatilize under the polymerization conditions may be used as internal refrigerating-diluents. The reactant may be added in regulated small amounts to a solution of the catalyst, or the reactant and the catalyst may be brought together in continuous streams to form a continuous process with continuous withdrawal of the product. The polymerization may be controlled with the use of promoting agents or catalyst inhibitors, which may be added at any stage of the reaction.

Using described conditions which favor additive polymerization of the alkyl acetylenes to homologous polymers, controlled amounts of different polymerizable monomers may be used to copolymerize therewith, as for example, isobutene, diolefins, styrene, acrylonitrile, or acrylates to obtain other useful products. In certain instances, it might be desirable to copolymerize an alkyl-alpha-acetylene, e. g. ethyl acetylene, with an alkenyl acetylene, e. g. vinyl acetylene, in certain proportions so as to derive tri-substituted benzenes containing vinyl side chains as in styrene, and therefore, useful as further polymerizable materials. For example, ethyl acetylene and vinyl acetylene may be made to react in order to form di-ethyl styrene.

In addition to the indicated utilization of the unsaturated higher molecular weight polymers, this product may be modified for other uses. For example, if the products of Example IV are treated with negative elements, such as, oxygen, nitrogen, phosphorus, sulfur, and/or a halogen, or a compound having a polar radical containing such elements which readily add on to the olefinic double bonds in the polymer, so as to use up unsaturation and eliminate drying tendencies, the thus modified polymers may be used as additives in lubricants to impart stringiness, increased film strength and stability to the lubricant composition. They may be used thus modified or partially hydrogenated in lubricating oils to improve flow characteristics, in some instances, particularly for reducing the pour point of hydrocarbon oils, and in some, particularly for thickening or improving the viscosity index of the oils.

As indicated by the general nature of the synthesis and the analyses of the products derived from the low temperature polymerization of the alkyl acetylenes, the polymer derivatives higher than the trimer may be represented as constituted of benzene ring units having both alkyl ($C_nH_{2n+1}\cdot$) and alkenyl ($\cdot C_nH_{2n+1}\cdot CH:CH\cdot$) side chain nuclear substituents, the alkenyl side chains being unsaturated hydrocarbon radicals containing the functional group —CH:CH—, or such a radical modified by absorbed oxygen, or some other added element, or group, which readily adds on to the olefinic double bonds. The thus substituted benzene ring units may be further represented as interlinked in higher molecular weight polymers which exhibit properties of a chain molecule. These higher molecular weight products are of resinous nature and may be used in formulating coating compositions or molded articles, in which they may be used together with inert fillers, suitable resins, pigments, dyes, plasticizers, or other agents.

The invention is not to be limited to any specific example described for it is intended to claim all novelty inherent in the invention, including modifications which come within the spirit thereof.

I claim:

1. A process of forming valuable polymer products which comprises polymerizing an alkyl acetylene in liquid phase at a temperature below about —10° C. in the presence of a Friedel-Crafts type catalyst.

2. The method of polymerizing alkyl acetylenes to yield a substantial amount of a tri-alkyl benzene and a substantial amount of higher molecular weight polymeric products having drying properties, which comprises polymerizing an alkyl acetylene in liquid phase with the aid of a Friedel-Crafts type catalyst at temperatures below —10° C.

3. The method of polymerizing alkyl acetylenes to yield a substantial amount of a trialkyl benzene and a substantial amount of higher molecular weight polymeric products having drying properties which comprises polymerizing an alkyl acetylene in liquid phase with the aid of a Friedel-Crafts type catalyst at temperatures below —10° C., fractionating the resultant polymers to recover a substantial yield of trialkyl benzene and a substantial yield of higher molecular weight polymeric products having drying properties and reacting the latter with oxygen.

4. A process of forming valuable polymer products which comprises polymerizing ethyl acetylene in liquid phase at a temperature of about —80° C. in the presence of aluminum chloride as the catalyst.

5. A process of forming valuable polymer products which comprises polymerizing ethyl acetylene in liquid phase at a temperature of about —80° C. in the presence of aluminum chloride as the catalyst and fractionating the resultant polymer product to recover a substantial yield of triethyl benzene and a substantial yield of a higher molecular weight polymer having drying properties.

6. A process of forming valuable polymeric derivatives of an alkyl-alpha-acetylene which comprises polymerizing an alkyl-alpha-acetylene at temperatures below about −10° C. in liquid phase with a Friedel-Crafts type catalyst, and reacting resulting polymers having higher molecular weights than the trimer with a substance that adds on to olefinic double bonds in said polymers, so as to use up unsaturation and diminish the drying tendencies of the polymer.

7. A polymeric derivative of an alkyl-alpha-acetylene monomer constituted of benzene rings having nuclear substituents of alkyl and alkenyl side chain radicals, and having an average molecular weight at least five times that of the monomer produced by the process defined in claim 2.

8. A polymeric ethyl acetylene which is viscous to resinous in character, having drying properties and compatibility with hydrocarbon resins produced by the method defined in claim 5.

9. A composition comprising a plastic isobutylene polymer substantially increased in toughness by an alkyl-alpha-acetylene polymer drying oil modified by absorption of oxygen produced by the method defined in claim 3.

10. A composition comprising a blend of a liquid to solid hydrocarbon containing in solution a polymeric derivative of an alkyl-alpha-acetylene constituted of benzene ring units having nuclear substituents of alkyl and alkenyl side chain radicals and having an average molecular weight at least five times that of the monomer produced by the method defined in claim 2.

11. A process of forming valuable polymer products from an alkyl-alpha acetylene and another polymerizable monomeric compound capable of forming copolymers with alkyl-alpha acetylenes under the reaction conditions applied which comprises polymerizing a mixture of an alkyl alpha acetylene and said other polymerizable monomeric compound in liquid phase in contact with a Friedel-Crafts type catalyst at temperatures below about −10° C.

MILLER W. SWANEY.